US012712618B2

(12) United States Patent
Yao et al.

(10) Patent No.: US 12,712,618 B2
(45) Date of Patent: Aug. 18, 2026

(54) 8TX CODEBOOK ENHANCEMENTS

(71) Applicant: ZTE Corporation, Shenzhen (CN)

(72) Inventors: Ke Yao, Shenzhen (CN); Bo Gao, Shenzhen (CN); Xiaolong Guo, Shenzhen (CN); Meng Mei, Shenzhen (CN); Yang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 299 days.

(21) Appl. No.: 18/395,161

(22) Filed: Dec. 22, 2023

(65) Prior Publication Data

US 2024/0195478 A1 Jun. 13, 2024

Related U.S. Application Data

(63) Continuation of application No. PCT/CN2022/123445, filed on Sep. 30, 2022.

(51) Int. Cl.

*H04W 8/22* (2009.01)
*H04B 7/06* (2006.01)
*H04W 72/231* (2023.01)

(52) U.S. Cl.

CPC ......... *H04B 7/0639* (2013.01); *H04B 7/0691* (2013.01); *H04W 8/22* (2013.01); *H04W 72/231* (2023.01)

(58) Field of Classification Search

CPC ..... H04W 8/22; H04W 72/044; H04W 72/23; H04W 72/231

See application file for complete search history.

(56) References Cited

U.S. PATENT DOCUMENTS

| | | | | |
|---|---|---|---|---|
| 2013/0183503 | A1 | 7/2013 | Hayashi et al. | |
| 2018/0183503 | A1 | 6/2018 | Rahman et al. | |
| 2019/0081671 | A1 | 3/2019 | Yang et al. | |
| 2019/0181934 | A1 | 6/2019 | Kang et al. | |
| 2020/0119788 | A1 | 4/2020 | Huang et al. | |
| 2020/0220590 | A1 | 7/2020 | Sun | |
| 2021/0281448 | A1 | 9/2021 | Li et al. | |
| 2021/0328644 | A1* | 10/2021 | Hao | H04B 7/0486 |
| 2022/0085960 | A1* | 3/2022 | Li | H04L 5/0051 |

(Continued)

FOREIGN PATENT DOCUMENTS

| | | |
|---|---|---|
| CN | 109478908 A | 3/2019 |
| WO | 2022082689 A1 | 4/2022 |

OTHER PUBLICATIONS

International Search Report and Written Opinion for International Application No. PCT/CN2022/123445, mailed on Jun. 26, 2023 (8 pages).

(Continued)

*Primary Examiner* — Sam Bhattacharya
(74) *Attorney, Agent, or Firm* — Ashurst Perkins Coie US LLP

(57) ABSTRACT

An example method includes receiving a configuration from the wireless communication node. The configuration indicates at least one of one or more numbers of port groups or one or more levels of coherence. The example method further includes determining a precoder for a transmission according to the configuration. The example method further includes performing the transmission using the precoder. In some embodiments, a total number of ports across the port groups is eight.

18 Claims, 8 Drawing Sheets

(56) References Cited

U.S. PATENT DOCUMENTS

2022/0167389 A1* 5/2022 Kim ...................... H04L 5/0023
2023/0087859 A1* 3/2023 Shahmohammadian .................... H04L 5/0048 370/329
2023/0261841 A1 8/2023 Liu et al.
2023/0344498 A1* 10/2023 Huang ................. H04B 7/0608

OTHER PUBLICATIONS

EPO, Extended European Search Report for Application No. 22947058.8, mailed on Aug. 28, 2024 (9 pages).
KIPO, Office Action for Korean Application No. 10-2023-7044977, mailed on Jul. 10, 2025, 5 pages with unofficial English translation.
JPO, Notice of Allowance for Japanese Application No. 2023-580740, mailed on Sep. 5, 2025, 3 pages with unofficial English translation.
Zte, "SRI/TPMI enhancement for enabling 8 TX UL transmission," 3GPP TSG RAN WG1 #110, Toulouse, France, R1-2205924, Aug. 22-26, 2022, 11 pages.
NTT Docomo, Inc., "Discussion on DMRS enhancements," 3GPP TSG RAN WG1 #110, Toulouse, France, R1-2207396, Aug. 22-26, 2022, 17 pages.
Nokia et al., "UL enhancements for enabling 8Tx UL transmission," 3GPP TSG RAN WG1 #110, Toulouse, France, R1-2207550, Aug. 22-26, 2022, 17 pages.
MediaTek Inc., "CSI enhancement for high/medium UE velocities and coherent JT," 3GPP TSG RAN WG1 #110, Toulouse, France, R1-2206992, Aug. 22-26, 2022, 22 pages.
Catt, "On codebook and SRI/TPMI enhancement for UL 8 TX," 3GPP TSG RAN WG1 #110, Toulouse, France, R1-2206381, Aug. 22-26, 2022, 5 pages.
Moderator (InterDigital, Inc.), "FL Summary on SRI/TPMI Enhancements; Third Round," 3GPP TSG RAN WG1 #110, Toulouse, France, R1-2208012, Aug. 22-26, 2022, 23 pages.
Moderator (InterDigital, Inc.), "Recommended Direction on SRI/TPMI Enhancements for RAN1#110b-e," 3GPP TSG RAN WG1 #110, Toulouse, France, R1-2208013, Aug. 22-26, 2022, 14 pages.
KIPO, Office Action for Korean Patent Application No. 10-2023-7044977 mailed Apr. 2, 2025, 6 pages with English summary.
JPO, Penultimate Office Action for Japanese Patent Application No. 2023-580740 mailed Jun. 3, 2025, 6 pages with English summary.
CIPO, Office Action for Canadian Patent Application No. 3,225,058 mailed Feb. 14, 2025, 3 pages.
KIPO, Office Action for Korean Application No. 10-2023-7044977, mailed on Nov. 3, 2025, 6 pages with translation.
KIPO, Notice of Allowance for Korean Application No. 10-2023-7044977, mailed on Mar. 6, 2026, 10 pages with translation.

* cited by examiner

8TX CODEBOOK ENHANCEMENTS

CROSS-REFERENCE TO RELATED APPLICATION

This application is a continuation and claims priority to International Application No. PCT/CN2022/123445, filed on Sep. 30, 2022, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for enhancing 8Tx transmission precoding. Example embodiments disclosed herein address technical problems related to current codebook issues, overhead of precoder indication, and unclear port indexing for uplink 8Tx. Example embodiments provide solutions related to determining codebook for uplink 8Tx transmission, reducing a number of candidates for non-coherent codebooks, and port index mapping.

In an exemplary aspect, a method for wireless communication is described. The method includes receiving, from a wireless communication node, a configuration that indicates at least one of one or more numbers of port groups or one or more levels of coherence. The method further includes determining a precoder for a transmission according to the configuration. The method further includes performing the transmission using the precoder.

In some embodiments, a total number of ports is eight. In some embodiments, the one or more numbers of port groups indicated by the configuration includes one or more of: one port group, two port groups, four port groups, or eight port groups; and the one or more levels of coherence indicated by the configuration includes one or more of: full coherence, a first type of partial coherence, a second type of partial coherence, and non-coherence.

In some embodiments, the method further includes transmitting, to the wireless communication node, information that indicates one or more supported numbers of port groups or one or more supported levels of coherence. In some embodiments, an indicated number of port groups or an indicated level of coherence is a highest capability that indicates that one or more capabilities lower than the highest capability are configured or supported. In some embodiments, an order of port group capabilities from highest to lowest is one port group, two port groups, four port groups, and eight port groups, and an order of coherence capabilities from highest to lowest is full coherence, a first type of partial coherence, a second type of partial coherence, and non-coherence.

In some embodiments, determining a precoder for a transmission according to the configuration includes determining a presence or a size of an indication of number of port groups for codebook indication according to the configuration. In some embodiments, determining a precoder for a transmission according to the configuration includes: determining one or more numbers of port groups for a codebook indication, and determining presence or size of an indication of number of port groups according to the determined one or more numbers of port groups for the codebook indication. In some embodiments, determining a precoder for a transmission according to the configuration includes: determining a given number of port groups according to an indication of number of port groups, and determining at least one of a rank, a number of layers, or a transmit precoding matrix indicator (TPMI) for each port group of the given number of port groups. In some embodiments, determining a precoder for a transmission according to the configuration includes: determining a given number of port groups according to an indication of number of port groups, determining a phase between each two port groups of the given number of port groups, and determining at least one of a rank or a TPMI for at least some of the port groups of the given number of port groups. In some embodiment, the indication of number of port groups is included in a downlink control information (DCI), a media access control (MAC) control element (CE), or a radio resource control (RRC) signalling.

In some embodiments, the precoder is determined from parameters of a downlink codebook-based scheme based on the one or more numbers of port groups being one port group, or the precoder is determined from parameters of an uplink codebook-based scheme based on the one or more numbers of port groups being more than one port group which are coherent.

In some embodiments, the method further includes determining a value of an oversampling factor for a polarization direction according to a number of antenna elements on the polarization direction.

In some embodiments, the configuration is received via one of a RRC signaling, a MAC CE, or a DCI.

In some embodiments, the precoder is determined based on at least one of a number of port groups, a starting port index, or a port index order. In some embodiments, the precoder is determined based on a consecutive number of port indexes according to the at least one of the number of port groups, the starting port index, or the port index order. In some embodiments, the starting port index is determined based on the number of port groups. In some embodiments, the port index order is one of: {0,4,1,5,2,6,3,7}, {0,1,2,3,4,5,6,7}, {0,2,1,3,4,6,5,7}, {0,1,4,5,2,3,6,7}, or {0,4,2,6,1,5,3,7}.

In some embodiments, the method further includes mapping ports of one or more port groups to ports of the precoder according to at least one of one or more pre-defined mappings. In some embodiments, the one or more pre-defined mappings include: a mapping of two port groups each having four ports to ports {0,1,4,5,2,3,6,7} of the precoder or to ports {0,2,4,6,1,3,5,7} of the precoder, or a mapping of four port groups each having two ports to ports {0,4,1,5,2,6,3,7} of the precoder.

In another exemplary aspect, another method for wireless communication is disclosed. The method includes transmitting, to the wireless communication device, a configuration that indicates at least one of one or more numbers of port groups or one or more levels of coherence. The method further includes indicating, to the wireless communication device, a precoder for a transmission according to the configuration, or an indication of number of port groups. The transmission is then performed with the precoder.

In some embodiments, the method further includes determining a presence or a size of an indication of number of port groups for codebook indication.

In some embodiments, a total number of ports is eight. In some embodiments, the particular number of port groups is one of: one port group, two port groups, four port groups, or eight port groups; and wherein the particular level of coherence is one of: full coherence, a first type of partial coherence, a second type of partial coherence, and non-coherence.

In some embodiments, an indicated number of port groups or an indicated level of coherence is a highest capability that indicates that one or more capabilities lower than the highest capability are supported or configured. In some embodiments, an order of port group capabilities from highest to lowest is one port group, two port groups, four port groups, and eight port groups, and an order of coherence capabilities from highest to lowest is full coherence, a first type of partial coherence, a second type of partial coherence, and non-coherence.

In some embodiments, the indication of number of port groups is included in a DCI, a MAC CE, or an RRC signaling.

In some embodiments, the method further includes indicating a number of antenna elements for a polarization direction in the configuration.

In some embodiments, the configuration is transmitted via one of a radio resource control (RRC) signaling, a medium access control (MAC) control element, or a downlink control indicator (DCI).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1A:
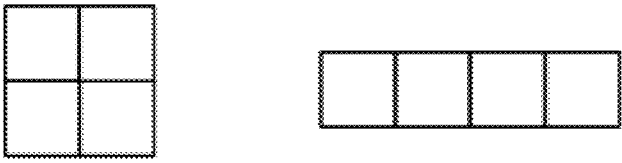
FIGS. 1A-1C illustrates different physical antenna layouts for different numbers of port groups.

The new radio (NR) technology of fifth generation (5G) mobile communication systems is continuously improved to provide higher quality wireless communication. One of the key features is the support of high frequency bands. High frequency bands have abundant frequency domain resources, but wireless signals in high frequency bands decay quickly and coverage of the wireless signals becomes small. Thus, transmitting signals in a beam mode is able to concentrate energy in a relatively small spatial range and to improve the coverage of the wireless signals in the high frequency bands.

However, some technical problems exist, particular with the transmission of signals in beam modes and in other example scenarios. First, for a user equipment (UE) configured for full coherence, the downlink (DL) type I codebook or the uplink (UL) 2Tx/4Tx codebooks may be adopted for transmission, but the downlink type I codebook is not defined for some cases including a multi-panel coherent scenario. Second, the overhead of precoder indication is large. Third, port indexing for uplink (UL) 8Tx is not clear. Example embodiments disclosed herein address at least these technical problems.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

Example Embodiment 1

Embodiments disclosed herein relate to methods for determining a codebook for UL 8Tx.

As indicated, for full coherent UE, the DL type I codebook or UL 2TX/4TX codebook may be adopted, but DL type I codebook is not defined for some cases for multi-panel coherent scenario. Additionally, as indicated, overhead of precoder indication is large.

Table 1 indicates supported codebook and rank indication according to number of port groups and coherent capability. Table 1 describes different multi-panel coherence scenarios.

TABLE 1

| Ng | physical UE antenna layout up to UE capability | part 1: full coherent (1 Rank value of 1-8) | part 2: partial coh 1 (2 ranks with 0~4) | part 3: partial coh 2 (4 ranks with 0~2) |
|---|---|---|---|---|
| 1 | CAT-A0: one port group (full coherent) | CAT-A0: ✓ If supporting Alt1-b: DL Type I single-panel ✓ If supporting Alt2-a: common 4Tx UL-TPMI with one additional co-phase, e.g., $W_{4\times4} \overset{\phi_n}{\Longrightarrow} W_{8\times8} = \begin{bmatrix} W_{4\times4} & W_{4\times4} \\ \phi_n W_{4\times4} & -\phi_n W_{4\times4} \end{bmatrix}$ | CAT-B0: ✓ 2 individual 4Tx UL-TPMIs | CAT-C0: ✓ 4 individual 2Tx UL-TPMIs |
| 2 | CAT-A1: 2 port groups (coherent across groups) CAT-B0: 2 port groups (non-coherent across groups) | CAT-A1: ✓ If supporting Alt1-b: DL Type 1 multi-panel ✓ If supporting Alt2-a: common 4Tx UL-TPMI with one additional co-phase | | |
| 4 | CAT-A2: 4 port groups (coherent across groups) CAT-B1: 4 port groups (coherent among each 2-group, non-coh across two 2-groups) CAT-C0: 4 port groups (non-coherent across groups) | CAT-A2: ✓ If supporting Alt1-b: DL Type multi-panel ✓ If supporting Alt2-a: common 2Tx UL-TPMI with 3 additional co-phases | CAT-B1 ✓ For each panel-pair (including 4 antenna ports), common 2Tx UL-TPMI with one additional co-phase | |

Figure 1B:
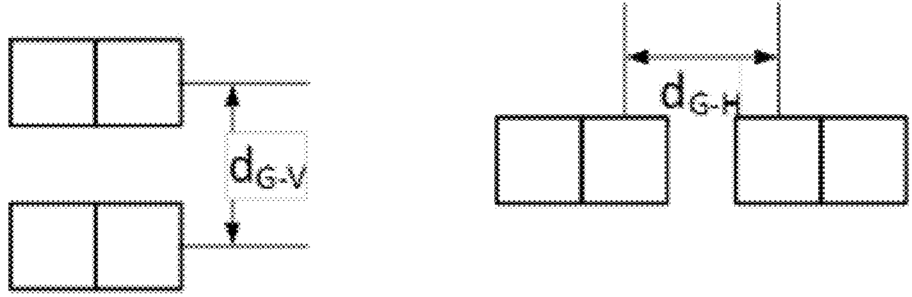
Figure 1C:
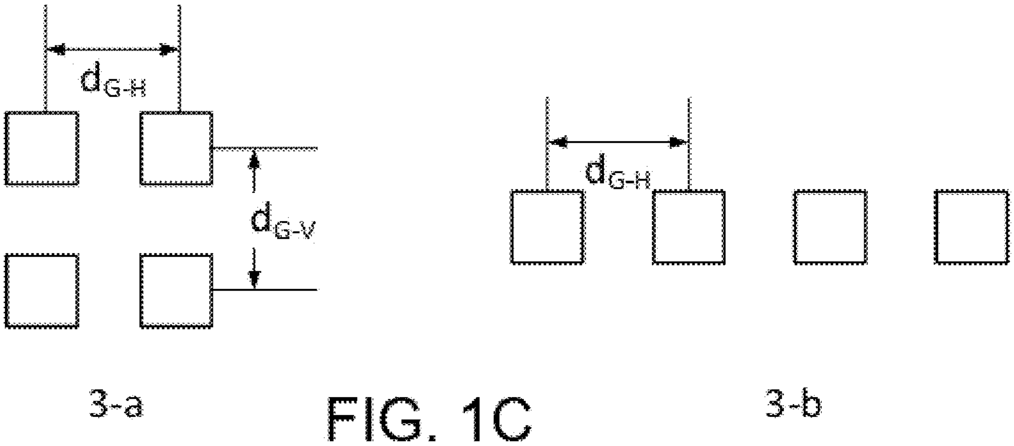

Physical antenna layouts corresponding to those represented in Table 1 are shown in FIGS. 1A-1C. In some embodiments, each square illustrated in each of FIGS. 1A-1C represents a pair of antenna ports, and FIGS. 1A-3C illustrate physical antenna layouts for 8Tx. For example, FIG. 1A illustrates example physical layouts for one port group, FIG. 1B illustrates example physical layouts for two port groups, and FIG. 1C illustrates example physical layouts for four port groups. As represented in Table 1 and illustrated in FIGS. 1B and 1C, different multi-panel coherence scenarios exist at least for two port group and four port group examples.

1. Design for Full-Coherent 8-Tx Codebook:

For full coherent UE, the following categories are considered:

CAT-A0: One port group (with 8Tx ports), coherent within the port group.

CAT-A1: Two port groups (each with 4Tx ports), coherent within a port group, non coherent across groups.

CAT-A2: Four port groups (each with 2Tx ports), coherent within a port group, non coherent across groups.

Note that a port group can be realized by one panel, or multi-panel with uniform spacing.

In some embodiments, for full coherent codebook design:

DL Type I single-panel codebook scheme can be used for CAT-A0.

DL Type I multi-panel codebook scheme can be used for CAT-A1 and A2.

For full coherent codebook design, CAT-A0 and CAT-A1 may have the same UL 4Tx transmit precoding matrix indicator (TPMI) based scheme, i.e., one common UL 4Tx TPMI and an additional co-phase. CAT-A2 may have a similar scheme, i.e., one common UL 2Tx TPMI and 3 additional co-phases.

For example, UL 4-Tx codebook scheme provides rank 1/2/3/4 four-port codebook, which can be enhanced to rank 2/4/6/8 eight-port codebook by using an additional phase offset $\phi_n$. Then rank 1-8 eight-port codebook can be determined as a subset of the columns, e.g., the first R (rank value) columns. A basic $W_{4\times4}$ full-coherent codebook, can be extended to rank-8 eight-port codebook $W_{8\times8}$, as shown below in Equation 1.

Equation 1

$$W_{4\times4} = \begin{bmatrix} w_{0,0} & w_{0,1} & w_{0,2} & w_{0,3} \\ w_{1,0} & w_{1,1} & w_{1,2} & w_{1,3} \\ w_{2,0} & w_{2,1} & w_{2,2} & w_{2,3} \\ w_{3,0} & w_{3,1} & w_{3,2} & w_{3,3} \end{bmatrix} \overset{\phi_n}{\Longrightarrow} W_{8\times8} = \begin{bmatrix} W_{4\times4} & W_{4\times4} \\ \phi_n W_{4\times4} & -\phi_n W_{4\times4} \end{bmatrix}$$

Similarly, a basic $W_{2\times2}$ full-coherent codebook, can be extended to rank-8 8-port codebook $W_{8\times8}$, as shown below in Equation 2.

Equation 2

$$W_{2\times2} = \begin{bmatrix} w_{0,0} & w_{0,1} \\ w_{1,0} & w_{1,1} \end{bmatrix} \overset{\phi_{n,1},\phi_{n,2},\phi_{n,3}}{\Longrightarrow} W_{8\times8} = \begin{bmatrix} W_{2\times2} & W_{2\times2} & W_{2\times2} & W_{2\times2} \\ \phi_{n,1}W_{2\times2} & -\phi_{n,1}W_{2\times2} & \phi_{n,1}W_{2\times2} & -\phi_{n,1}W_{2\times2} \\ \phi_{n,2}W_{2\times2} & \phi_{n,2}W_{2\times2} & -\phi_{n,2}W_{2\times2} & -\phi_{n,2}W_{2\times2} \\ \phi_{n,3}W_{2\times2} & -\phi_{n,3}W_{2\times2} & -\phi_{n,3}W_{2\times2} & \phi_{n,3}W_{2\times2} \end{bmatrix}$$

In some examples, a number of candidate values of $\phi_n$ is 2 or 4.

Therefore, it may be considered to adopt DL based codebook scheme for one port group full-coherent case (e.g., above CAT-A0), and UL based codebook scheme for multiple port groups full-coherent cases (e.g., above CAT-A1 and A2).

2. Design for Partial-Coherent 8-Tx Codebook:

Partial-coherent 8-Tx codebook can be used for partial-coherent UE, and full- and partial-coherent UE.

8Tx ports can be divided into multiple port groups to support partial-coherent, where ports included in a port group are coherent, and ports cross port groups can be coherent or not coherent.

In some embodiments, partial-coherent 8Tx considers at least the following types:

Partial-coherent type 1, i.e., 4+4: two port groups each with four ports, each port group has an individual rank of 0-4. For example, CAT-B0 includes two port groups each with 4Tx ports and is non-coherent across groups. For example, CAT-B1 includes four port groups each with 2Tx ports and is coherent among four Tx ports within a pair of port groups and is non-coherent across two pairs of port groups.

Partial-coherent type 2, i.e., 2+2+2+2: four port groups each with two ports, each port group has an individual rank of 0-2. For example, CAT-CO includes four port groups each with 2Tx ports and is coherent among four Tx ports within each port group and is non-coherent across port groups.

In some embodiments, each port group may have an individual TPMI/precoding vector, or a shared TPMI/precoding vector, depending on antenna/panel layout assumption on UE. If a UE, especially for customer terminal equipment or customer premise equipment (CPE), has similar antenna configuration to a network node (e.g., a gNodeB), a shared TPMI/precoding vector is reasonable with lower overhead for TPMI indication. If port groups are coherent, a shared TPMI/precoding vector should be applied.

Regarding candidate codebook for each port group, UL 4-Tx codebook can be considered for 4-Tx port group, and UL 2-Tx codebook can be considered for 2-Tx port group. Further considerations are:

For each port group, rank can be independent. For each 4-port group, rank can be 0-4. For each 2-port group, rank can be 0-2. But, in some embodiments, it is precluded that rank(s) for each port group are all zero.

Full-coherent 2Tx/4Tx TPMI vs. Full-coherent+partial+non coherent 2Tx/4Tx TPMI: Combinations of all possible rank+TPMI for each port group may cause a huge number of candidate codebooks for partial-coherent. As such, in some embodiments, full-coherent 2Tx/4Tx TPMI is preferred.

Embodiments disclosed herein include UE-capability related solutions to the above-identified issues and technical problems.

In some embodiments, to support UL 8Tx transmission, a UE transmits capability information to a network that relates to port group capability and/or coherence capability. In some embodiments, the capability information includes at least one of information of a number of port groups or information related to coherence level.

For information of number of port groups, one of the following schemes can be adopted:

1. A highest level number of port groups is indicated by the UE to the network. Indication of the highest level number of port groups means other levels of number of port groups which are lower than the highest level can be supported. In some embodiments, the levels of numbers of port groups in a descending order can be: one port group, two port groups, four port groups, or eight port groups. Thus, for example, if a UE indicates a highest level of port groups as two port groups, the UE indicates that the UE also supports four port groups and eight port groups, but not one port group.
2. One or more supported levels of numbers of port groups are indicated by the UE to the network. For example, the UE explicitly indicates each supported number of port groups to the network. The one or more supported levels can be indicated from a predefined candidate set, each indicating one or more levels, for example, according to Table 2. There are 16 entries each for a number of port groups or a combination of more than one number of port groups. In some embodiments, the candidate entries may comprise subset of the entries shown in Table 2.

TABLE 2

| | One level (# of port groups) | | | |
|---|---|---|---|---|
| | 1 | 2 | 4 | 8 |
| Multiple levels (# of port groups) | 1, 2<br>2, 8<br>1, 4, 8 | 1, 4<br>4, 8<br>2, 4, 8 | 1, 8<br>1, 2, 4<br>1, 2, 4, 8 | 2, 4<br>1, 2, 8 |

Thus, in either scheme, the UE indicates one or more numbers of port groups that the UE supports to the network, in some embodiments.

For coherence level information, one of the following schemes can be adopted:

1. A highest coherence level is indicated by the UE to the network. Indication of the highest coherence level means other coherence levels which are lower than the highest level can be supported. In some embodiments, the coherence levels in a descending order can be: full coherent, first type of partial coherent, second type of partial coherent, and non-coherent which can be noted as coherent level 1, 2, 3, and 4, respectively. Thus, for example, if a UE indicates a highest coherence level of 2, then the UE indicates that the UE supports the first type of partial coherent, the second type of partial coherent, and non-coherent, but not full coherent.
2. One or more supported coherence levels are indicated by the UE to the network. The one or more supported coherence levels can be indicated from a predefined candidate set, each indicating one or more coherence levels, for example, according to Table 3. There are 16 entries each for a coherence level or a combination of more than one coherence level. In some embodiments, the candidate entries may comprise subsets of the entries shown in Table 3.

TABLE 3

| One level | 1 | 2 | 3 | 4 |
|---|---|---|---|---|
| Multiple levels | 1, 2<br>2, 4<br>1, 3, 4 | 1, 3<br>3, 4<br>2, 3, 4 | 1, 4<br>1, 2, 3<br>1, 2, 3, 4 | 2, 3<br>1, 2, 4 |

Thus, in either scheme, the UE indicates one or more coherence levels that the UE supports to the network, in some embodiments.

In some embodiments, a UE can report information of number of port groups without the coherence level information, and the one, two, four, or eight port groups corresponds to a highest coherent level 1, 2, 3, or 4, respectively.

In some embodiments, a UE can report information of number of port groups and the coherence level information. In some examples, one, two, or four port groups can support coherent level 1, 2, 3, or 4. Eight port groups can only support coherent level 4.

In some embodiments, to support UL 8Tx transmission, a network can transmit (or indicate or configure) at least one of following information to a UE: information of number of port groups, or coherence level information, e.g., via RRC signaling, MAC CE, or DCI. For example, the network (e.g., a wireless communication node) transmits a configuration to the UE that indicates the information. The port group information and the coherence level information can be indicated as described above for UE capability.

In some embodiments, to support UL 8Tx transmission, a network can transmit (or indicate or configure) at least one of following information to a UE, e.g., via RRC signaling, MAC CE, or DCI: candidate port groups, or candidate TPMI/precoder set.

Candidate port groups may include the port group information (as detailed above for UE capability). For example, candidate port groups can be a highest level number of port groups, which means other levels of number of port groups which are lower than the highest level can be supported. As another example, candidate port groups can be a codepoint indicating an entry of a predefined table (e.g., a table for one or more supported levels of numbers of port groups, Table 3). As yet another example, candidate port groups can be a bitmap indicating partial port groups can be supported. For example, in a four port group case, a bitmap 0001 indicates one (e.g., first or last one, highest number or lowest number) of the four port groups is the candidate port group. This candidate port group indication is port group selection information.

Candidate TPMI/precoder set may comprise a set of candidate TPMI/precoder for restriction or for available. For a UE, only partial of TPMI/precoders can be allowed to indicate in DCI.

In some embodiments, Tx can be transmit antenna, antenna port.

For a UE supporting 8Tx with one port group with full coherent level, it may by default or be indicated to support two port groups (each with 4Tx), four port groups (each with 2Tx) and/or eight port groups (each with 1 Tx). It may support full coherence (part 1 in Table 1) with one port group, a first type of partial coherence (part 2 in Table 1) with two port groups, a second type of partial coherence (part 3 in Table 1) with four port groups, and/or non-coherence (a part 4 stemming from Table 1) with eight port groups.

For a UE supporting 8Tx with two port groups with full coherent level, it may by default or be indicated to support four port groups (each with 2Tx) and/or eight port groups (each with 1 Tx). It may support full coherence (part 1 in Table 1) with two port groups, a first type of partial coherence (part 2 in Table 1) with two port groups, a second type of partial coherence (part 3 in Table 1) with four port groups, and/or non-coherence (part 4 as discussed) with eight port groups.

For a UE supporting 8Tx with two port groups with partial coherent 1 ports, it may by default or be indicated to support four port groups (each with 2Tx) and/or eight port groups (each with 1 Tx). It may support the first type of partial coherence (part 2) with two port groups, the second type of partial coherence (part 3) with four port groups, and/or non-coherence (part 4) with eight port groups.

For a UE supporting 8Tx with four port groups with full coherent level, it may by default or be indicated to support eight port groups each with one port. It may support full coherence (part 1) with four port groups, the first type of partial coherence (part 2) with four port groups, the second type of partial coherence (part 3) with four port groups, and/or non-coherence (part 4) with eight port groups.

For a UE supporting 8Tx with four port groups with partial coherent 1 ports, it may by default or be indicated to support eight port groups each with one port. It may support the first type of partial coherence (part 2) with four port groups, the second type of partial coherence (part 3) with four port groups, and/or non-coherence (part 4) with eight port groups.

For a UE supporting 8Tx with four port groups with partial coherent 2 ports, it may by default or be indicated to support eight port groups (each with 1 Tx). It may support the second type of partial coherence (part 3) with four port groups, and/or non-coherence (part 4) with eight port groups.

For a UE supporting 8Tx with eight port groups with non coherent ports. It may support non-coherence (part 4) with eight port groups.

A port group corresponds to a panel. If more than one port group are coherent, the precoder can be determined according to a small size precoder for one port groups, and one or more additional phase offsets.

In some embodiments, a UE determines a precoder for full coherent level according to a number of port groups. In some embodiments, for one port group, the precoder is determined according to a first set of parameters. For example, the first set of parameters correspond to a DL codebook based scheme. For example, the first set of parameters comprise at least one of: $i_1$ (may include $i_{1,1}$, $i_{1,2}$, $i_{1,3}$, or $i_{1,4}$), or $i_2$, values of $N_1$, $N_2$, $O_1$, $O_2$, codebookMode, and/or the like. In some embodiments, for more than one port group, the precoder is determined according to a second set of parameters. For example, the second set of parameters correspond to a UL codebook based scheme. For example, the second set of parameters comprise at least one of: TPMI, or one or more phase offsets, i.e., co-phasing.

In some embodiments, a UE determines a precoder according to a port group indication. The port group indication (i.e., an indication of number of port groups for a codebook indication) is indicated in a DCI, a MAC CE, or an RRC signaling, and can indicate a number of port groups. In some embodiments, the port group indication is an indication of number of port groups. For example, the indication of number of port groups can be used to select the given number of port groups or more than one numbers of port groups from a set of numbers of port groups according to the configuration, or according to the determined one or more numbers of port groups for the codebook indication.

The number of port groups can be one selected from a predetermined set of numbers, e.g., the predetermined set of numbers can be a set of (1, 2, 4, 8) or a subset of (1, 2, 4, 8). The set or subset can be determined according to a candidate port groups indication, e.g., via RRC signaling, MAC CE, or in a predetermined way.

For example, if the predetermined set of number is a set of (1, 2, 4, 8) according to the candidate port groups indication, via RRC signaling, then the port group indication field in DCI can be 2 bits.

For example, if the predetermined set of number is a set of (1, 2) according to the candidate port groups indication, via RRC signaling, or MAC CE, then the port group indication field in DCI can be 1 bit.

For a number of port group of 1, 2, 4, 8, the precoder indication corresponds to full coherence (part 1 in Table 1), a first type of partial coherence (part 2 in Table 1), a second type of partial coherence (part 3 in Table 1), and non-coherence (part 4 as discussed above) respectively.

For one port group corresponding to full coherence, one field of rank and TPMI/precoder can be further indicated.

For two port groups corresponding to a first type of partial coherence, two fields of rank and TPMI/precoder can be further indicated, each field with a rank and TPMI indication corresponding to a port group.

For four port groups corresponding to second type of partial coherence, four fields of rank and TPMI/precoder can be further indicated, each field with a rank and TPMI indication corresponding to a port group.

For eight port groups corresponding to non-coherence, eight fields of rank can be further indicated, each field corresponding to a port group, or one field of rank combination indication is indicated.

For full coherence with DL type I codebook, partial coherence (both types) with UL TPMI scheme, the overhead of precoder indication is analyzed according to Table 4 below for a "joint indication of rank+TPMI per group" indication.

TABLE 4

| port group indication | | rank + TPMI for all groups |
|---|---|---|
| 2 bits or 1 bit to indicate one number of port groups from candidate port groups | part1 | 7~9 bits (or more) for one rank + TPMI indication |
| | part2 | 5 + 5 = 10 bits for two rank + TPMI indications |
| | part3 | 3*4 = 12 bits (or less) for four rank + TPMI indications |
| | part4 | 8 bits or less for 8 ranks each with value of 0 or 1, or a combination of port selection indication |

In some embodiments, for each port group, the number of Tx ports (configured Tx ports) should be the same; coherent type should be the same; only full coherent TPMI/precoders set can be indicated; the rank parameter(s) are separately indicated; and the port group is disable by rank=0 or null. For example, #1 rank value including 0 or null is jointly coded with TPMI, #2 separate RI indication including 0 or null for a rank), or #3 RI combination including one or more ranks with "0 or null").

If more than one port group are non-coherent, a rank is indicated for each port group, and each port group with rank number of layers are not in same layer, i.e., separate layers, when determining an 8Tx precoder.

In some embodiments, to keep quadrature phase shift keying (QPSK) constellation, a restriction for N1, N2 and O1, O2 should be applied: N1*O1<=4, and N2*O2<=4. E.g., for N1 or N2 is 4, then O1 or O2 can be 1 respectively; for N1 or N2 is 2, then O1 or O2 can be 1, or 2 respectively.

In some embodiments, a UE is configured by a network values of N1, N2. N1, N2 represent numbers of rows and columns of antenna elements in a panel (antenna panel) respectively. In the case of value of N1, or N2 is O1, 1 or O2 is 1. In the case of value of N1 or N2 is 2, O1 or O2 can be 1 or 2, depending on an indication for oversampling, e.g., 1 bit to indicate 1, or 2, from a network. In the case of value of N1 or N2 is 4, O1 or O2 can be 1.

N1 is defined as a number of horizontal antenna elements on one polarization. N2 is defined as a number of vertical antenna elements on one polarization. O1 is defined as a value of an oversampling factor on one polarization in a horizontal direction. O2 is defined as a value of oversampling factor on one polarization in a vertical direction.

Example Embodiment 2

Example embodiments relate to methods for reducing number of candidates for non-coherent codebooks.

For non-coherence (part 4 as discussed), there are 255 cases with full flexibility for non-coherent cases. Compared with the number of precoders for full coherent, the number is quite a large value which causes a high overhead.

To address this high overhead issue, embodiments described below provide reductions of number of candidates for non-coherent codebooks.

1) Antenna Layout with 8 Groups:

Full flexibility: 255 cases

Fixed starting Tx port, e.g., 0, +consecutive Tx ports: # of cases: 8

Any starting Tx port+consecutive Tx ports: # of cases: 8+7+6+ . . . +2+1=36.

2) Antenna Layout with 4 Groups:

Starting port can be one from each port group (panel), e.g., {0, 2, 4, 6}

+consecutive rank value number of Tx ports, # of cases: 8+6+4+2=20

Or +"consecutive" rank value number of Tx ports with ordering of panels and/or polarization, e.g., {0, 2, 4, 6, 1, 3, 5, 7}, # of cases: 8+6+4+2=20 (from a group or in odd or even order)

3) Antenna Layout with 2 Groups:

Starting port can be one from each port group (panel), e.g., {0, 4}

+consecutive rank value number of Tx ports, # of cases: 8+4=12

Or +"consecutive" rank value number of Tx ports with ordering of panels and/or polarization, e.g., {0, 4, 2, 6, 1, 3, 5, 7}, # of cases: 8+4=12

4) Antenna Layout with 1 Group:

Fixed starting Tx port, e.g., 0, +consecutive or "consecutive" Tx ports: # of cases: 8.

In some embodiments, non-coherent 8-Tx codebook can be used for UE with non-coherent UE, partially+non coherent UE, and fully+partially+non coherent UE.

Non-coherent 8-Tx codebook can be seen as eight 1-port groups, each group has rank 0 or 1, and no TPMI is needed for each 1-port group. There are 255 codebooks considering full flexibility which is a comparable to that for fully coherent codebooks. For 8-Tx non coherent codebooks, such high flexibility may not be necessary due to large overhead. To reduce the number of candidates non-coherent codebooks, UE antenna layout may be considered.

Figure 2:
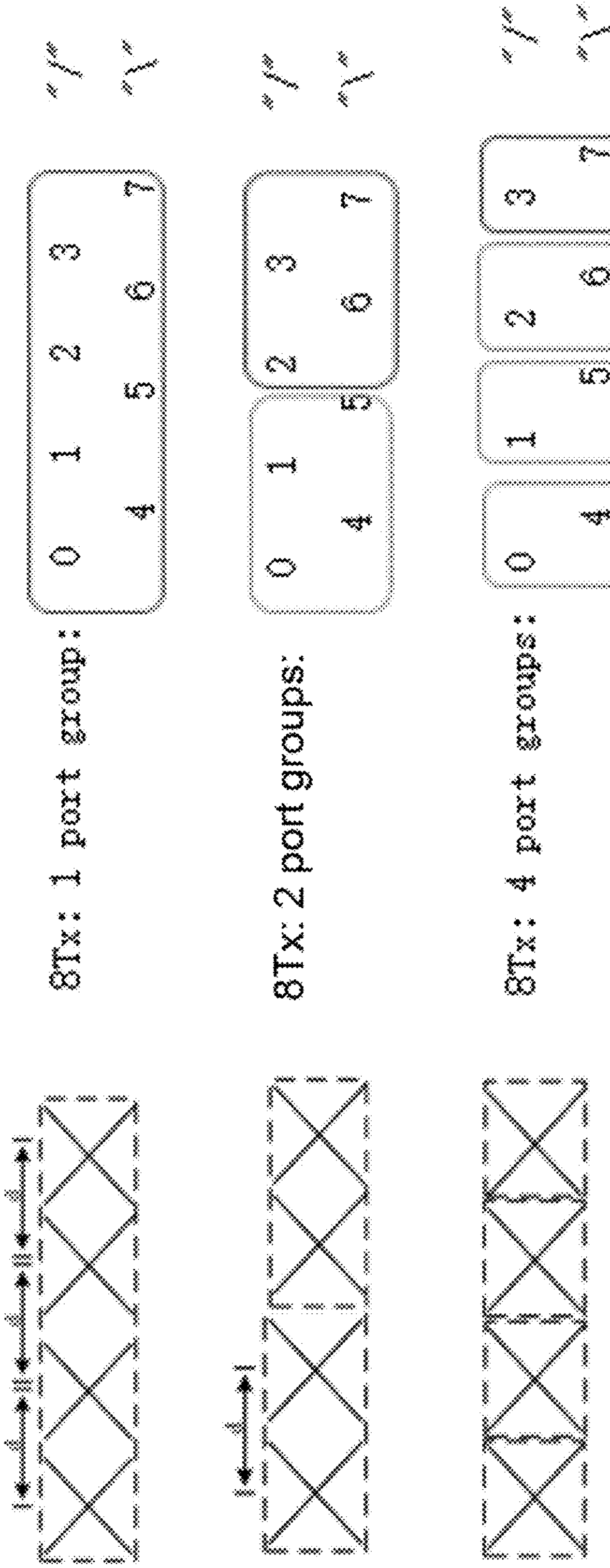
FIG. 2 illustrates example groupings of 8Tx ports.

For instance, a starting port index+a number of "consecutive" ports can be considered for selecting port combinations for non-coherent codebook. Assuming UL 8-Tx port indexing for one/two/four port groups as shown in FIG. 2, a number of candidates are evaluated as in Table 5. For a UE supporting two port groups, a starting port can be port 0, or port 2. For starting port 0, according to the non-circular port order (0,4,1,5,2,6,3,7), it can support (0), (0,4), . . . (0,4,1,5,2,6,3,7) for rank1-rank8 port selection. For starting port 2, according to the non-circular port order (0,4,1,5,2,6,3,7), it can support (2), (2,6), . . . (2,6,3,7) for rank1-rank4 port selection. So the number of candidates for two port groups non coherent codebook is 8+4=12.

According to the above rule, at most 36 candidate codebooks are needed. If a UE supports one port group, it may only need eight candidates. The non-circular port order (0,4,1,5,2,6,3,7) follows a rule that ports within less (converged) port groups are selected with priority. If diverged port groups are prioritized, the port order can also be replaced by another order.

TABLE 5

| # of groups | starting port | "consecutive" R = 1~8 ports with non-circular order | # of candidates |
|---|---|---|---|
| 1 group | 0 | (0, 4, 1, 5, 2, 6, 3, 7) | 8 |
| 2 groups | {0, 2} | | 8 + 4 = 12 |

TABLE 5-continued

| # of groups | starting port | "consecutive" R = 1~8 ports with non-circular order | # of candidates |
|---|---|---|---|
| 4 groups | {0, 1, 2, 3} | | 8 + 6 + 4 + 2 = 20 |
| 8 groups | {0, 1 . . . , 7} | | 8 + 7 + . . . + 1 = 36 |

In some embodiments, regarding non-coherent codebook design, a number of candidate non coherent codebooks is determined by the UE and the network (e.g., a node of the network) according to at least one of the following:

Number of port groups

Limited starting port index, e.g., depending on number of port groups

A predefined port index order, e.g., (0,4,1,5,2,6,3,7)

For example, for one port group, starting port can be port 0, candidate codebooks for non-coherence may have "consecutive" R=1~8 ports with non-circular order, e.g., (0,4,1,5,2,6,3,7) for rank 1-8 respectively. Codebook for rank 1 is selection of port 0, which means other ports, i.e., 1-7, are not selected. Codebook can be $W_{8\times1}=[1\ 0\ 0\ 0\ 0\ 0\ 0\ 0]^T$. Codebook for rank 4 is selection of port 0, 4, 1, 5 which means other ports, i.e., 2, 3, 6, 7, are not selected. Codebook can be Equation 3.

$$W_{8\times1} = \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \quad \text{Equation 3}$$

Codebook for rank 6 is selection of port 0, 4, 1, 5,2,6, which means other ports, i.e., 3,7, are not selected. Codebook can be Equation 4.

$$W_{8\times1} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \end{bmatrix} \quad \text{Equation 4}$$

For example, for two port groups, starting port can be port 0 or 2, candidate codebooks for non-coherence may have "consecutive" R=1~8 ports with non-circular order, e.g., (0,4,1,5,2,6,3,7) for rank 1-8 respectively. Codebook for rank 1 with starting port 0 is selection of port 0, which means other ports, i.e., 1-7, are not selected. Codebook for rank 1 with starting port 2 is selection of port 2, which means other ports, i.e., 0,1, 3-7, are not selected. Codebook for rank 4 with starting port 0 is selection of port 0, 4, 1, 5 which means other ports, i.e., 2, 3,6,7, are not selected. While Codebook for rank 4 with starting port 2 is selection of port 2,6,3,7 which means other ports, i.e., 0,4,1,5, are not selected.

Note that the precoders above are not normalized. In some embodiments, the precoders may need to multiply W by a ratio for normalization.

Example Embodiment 3

Example embodiments disclosed herein relate to methods for port index mapping.

Figure 3:
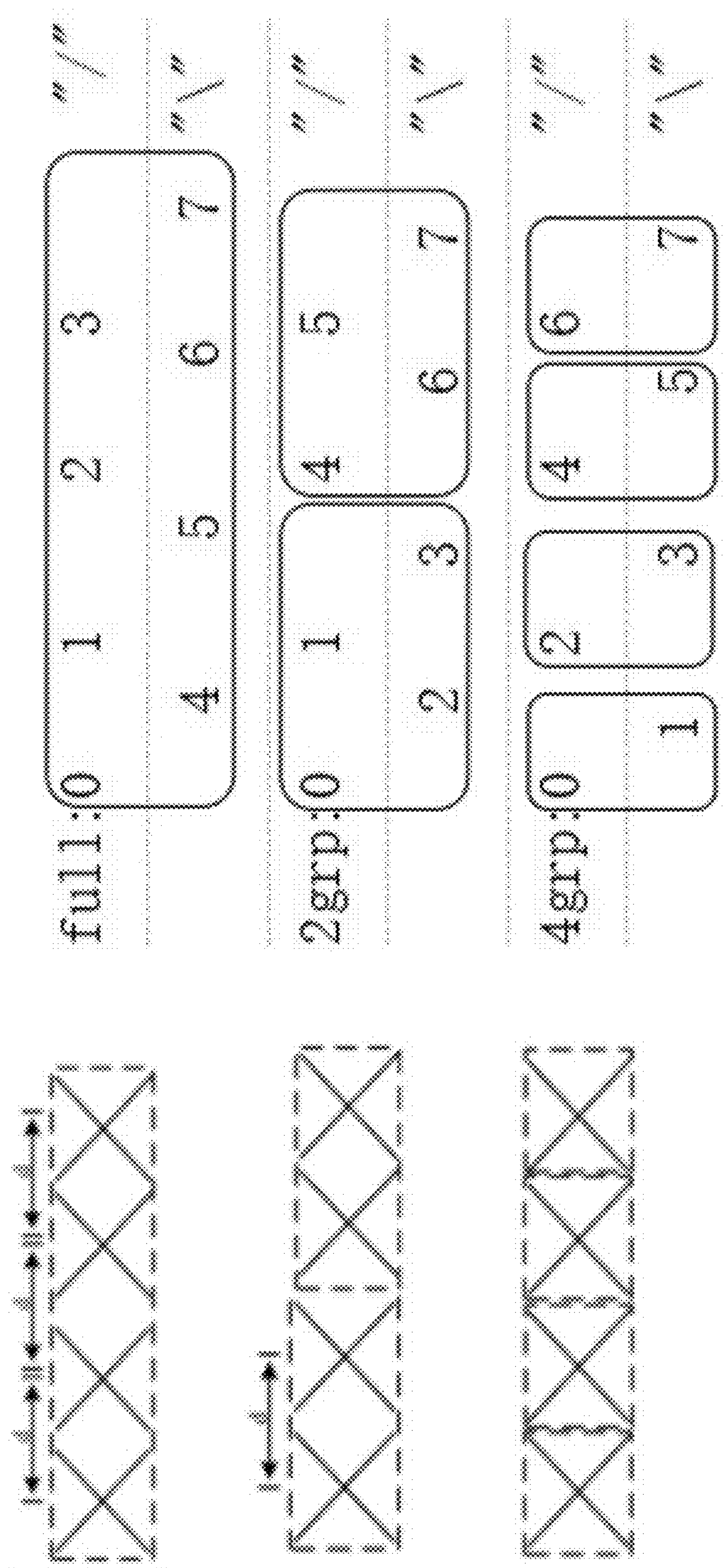
FIG. 3 illustrates example groupings of 8Tx ports according to a downlink port indexing scheme.

According to a DL port indexing scheme, as shown in FIG. 3:

for 8Tx full coherent with one port group: Port 0, 1, 2, 3 have same polarization direction, and port 4, 5, 6, 7 have the other same polarization direction. They belong to one port group or panel.

For 8Tx full coherent with two port groups: Port 0, 1, 2, 3 belong to one port group or panel, and are coherent. Among them port 0, 1 have same polarization direction, and port 2, 3 have the other same polarization direction. Port 4, 5, 6, 7 belong to another one port group or panel. Among them port 4, 5 have same polarization direction, and port 6, 7 have the other same polarization direction.

For 8Tx full coherent with four port groups: Port 0, 1 belong to one port group or panel, and are coherent, they have different polarization directions. Port 2, 3 belong to another one port group or panel and are coherent, they have different polarization directions. Port 4, 5 belong to another one port group or panel and are coherent, they have different polarization directions. Port 6, 7 belong to another one port group or panel and are coherent, they have different polarization directions.

Figure 4:
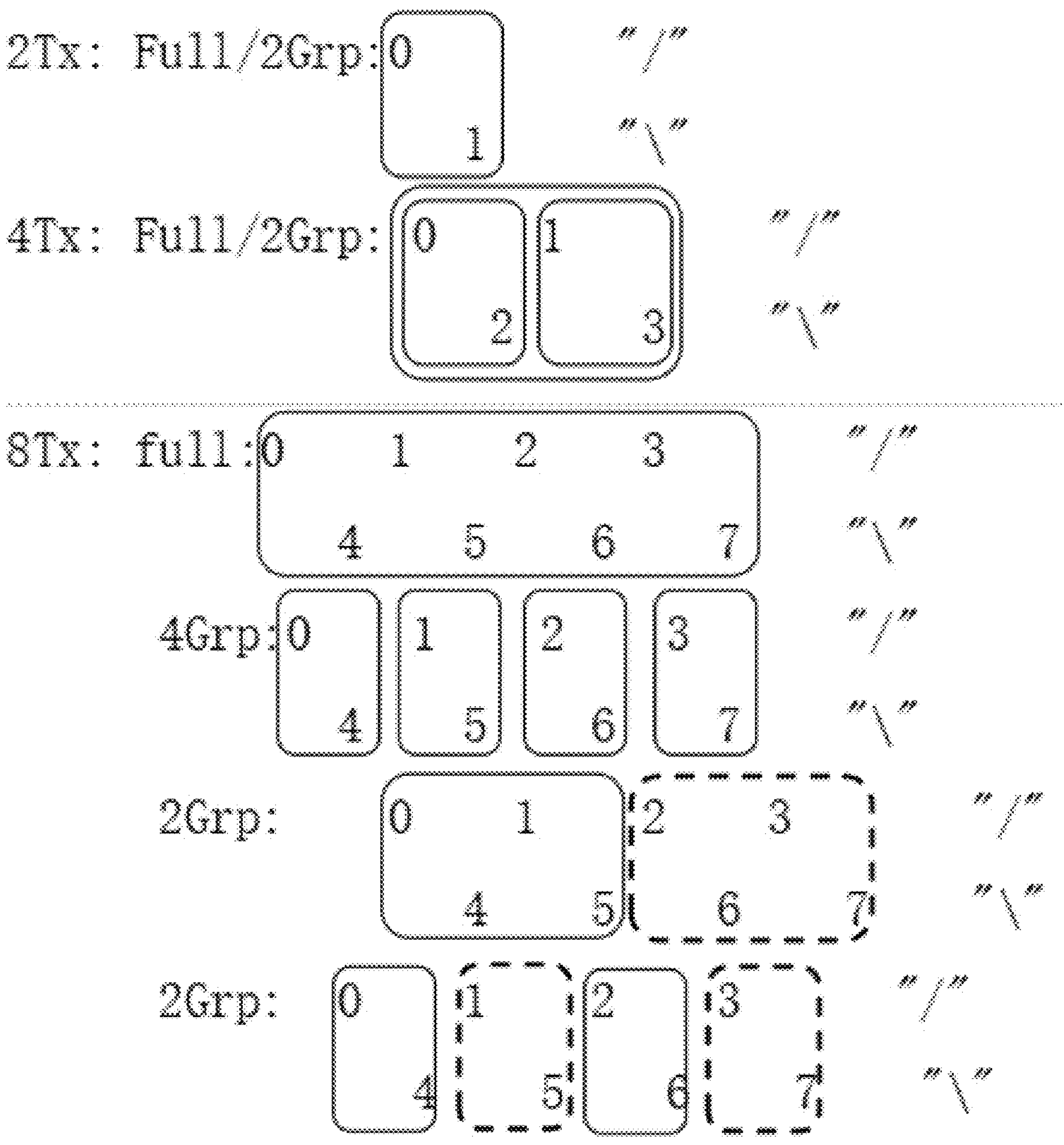
FIG. 4 illustrates example groupings of 8Tx ports according to an uplink port indexing scheme.

According to UL port indexing scheme, as shown in FIG. 4,

For 2Tx, it has the same port indexing for one port group and two port groups,

For 4Tx, it has the same port indexing for one port group and two port groups,

For UL 8Tx, it may follow UL port indexing rule or DL port indexing rule. If it follows DL rule, the mapping of port index and port groups cannot accommodate 2 groups with 4Tx, and 4 groups with 2Tx. If it follows UL rule, there is no reference for UL 8Tx.

To address this issue for the UL port indexing scheme, embodiments disclosed herein provide enhanced port index mapping.

In some embodiments, UL 8Tx precoding port index follows at least one of the following rules:

polarization pairs are 0-4, 1-5, 2-6, 3-7.

For partial coh, 2 group: one 4TX group with port (0, 1, 2, 3) and another 4TX group with port (0, 1, 2, 3) are mapped to 8TX (0, 1, 4, 5, 2, 3, 6, 7), or 8TX (0, 2, 4, 6, 1, 3, 5, 7).

For partial coh, 4 group: 2TX group 1, 2, 3, 4: port (0, 1), port (0, 1), port (0, 1), port (0, 1) are mapped to 8TX (0, 4, 1, 5, 2, 6, 3, 7).

Example Operations

As described herein, example embodiments detail UE capability reporting and/or network configuration to identify different modes (coherence and port groups). Example embodiments restrict candidate codebooks for overhead reduction of port group indications. Example embodiments reduce overhead of non-coherent codebook candidates. Example embodiments provide unified port indexing for UL 8Tx with one/two/four port groups.

Figure 5:
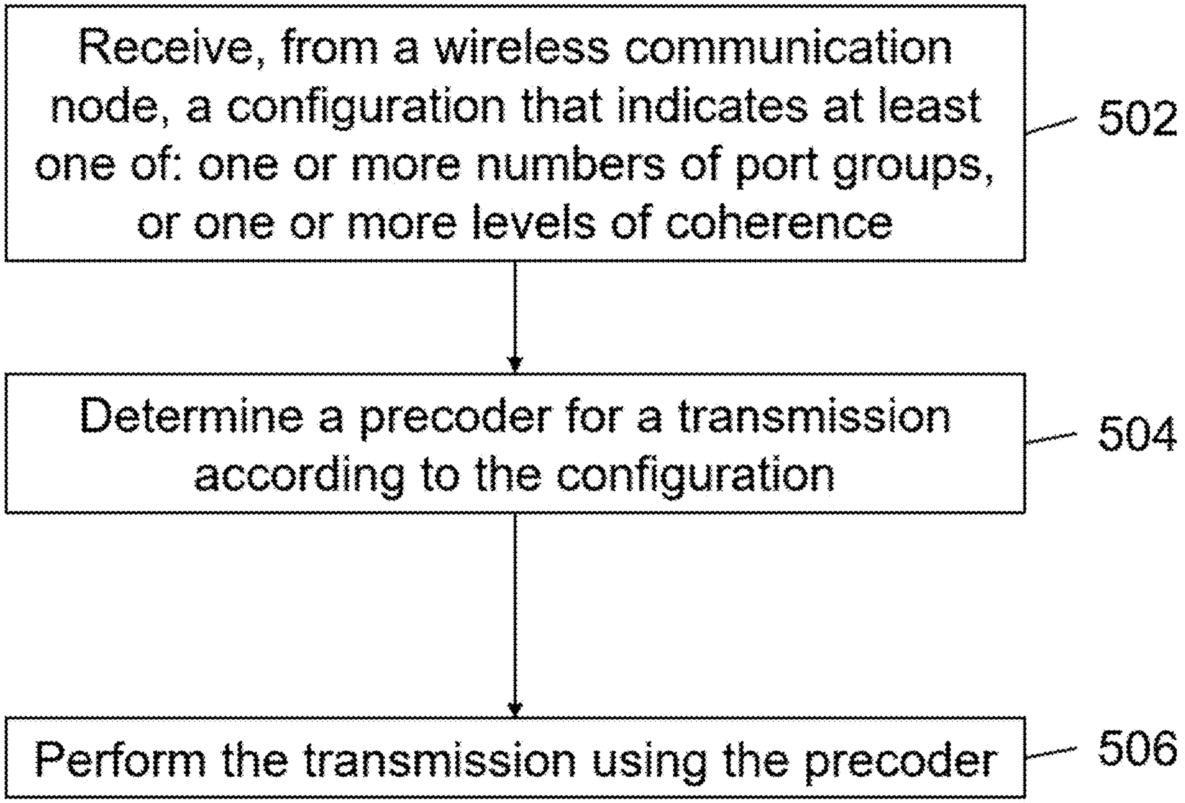
FIG. 5 shows an exemplary flowchart related to 8Tx transmission precoding by network configuration.

FIG. 5 shows an exemplary flowchart related to network configuration of 8Tx transmission precoding.

At operation 502, a wireless communication device (e.g., a UE) receives, from a wireless communication node (e.g., a base station), a configuration that indicates at least one of one or more numbers of port groups or one or more levels of coherence.

At operation 504, the wireless communication device determines a precoder for a transmission according to the configuration.

At operation 506, the wireless communication device performs the transmission using the precoder.

In some embodiments, a total number of ports is eight. For example, a total of eight ports are divided into a given number of port groups (e.g., one port group, two port groups, four port groups, eight port groups).

In some embodiments, the one or more numbers of port groups indicated by the configuration comprises one or more of: one port group, two port groups, four port groups, or eight port groups. In some embodiments, the one or more levels of coherence indicated by the configuration comprises one or more of: full coherence, a first type of partial coherence, a second type of partial coherence, and non-coherence. In some embodiments, the first type of partial coherence refers to all ports (e.g., eight ports) being split into two port groups which are not coherent with each other, while ports within a given port group are coherent with each other. For example, the first type of partial coherence refers to part 2 in Table 1. In some embodiments, the second type of partial coherence refers to all ports (e.g., eight ports) being split into four port groups which are not coherent with each other, while ports within a given port group are coherent. For example, the second type of partial coherence refers to part 3 in Table 1.

In some embodiments, the wireless communication device further transmits information that indicates one or more supported numbers of port groups or one or more supported levels of coherence (e.g., capability information). In some embodiments, the wireless communication device transmits this capability information prior to receiving the configuration from the wireless communication node at operation 502.

In some embodiments, an indicated number of port groups or an indicated level of coherence is a highest capability that indicates that one or more capabilities lower than the highest capability are configured (e.g., in the received configuration at operation 502) or supported (e.g., in capability information transmitted to the network). For example, one or more given capabilities are selected from the remaining capability set which have capabilities lower than the highest capability. The one or more given capabilities may have highest or lowest capability within the remaining capability set. Assuming highest capability is one port group, the given capability may be two port groups. Then, the capability of one port group may comprise one port group and two port groups. In some embodiments, an order of port group capabilities from highest to lowest is one port group, two port groups, four port groups, and eight port groups. In some embodiments, an order of coherence capabilities from highest to lowest is full coherence, a first type of partial coherence, a second type of partial coherence, and non-coherence.

In some embodiments, determining a precoder for a transmission according to the configuration (e.g., at operation 504) includes determining a presence or a size of an indication of number of port groups for codebook indication according to the configuration. The indication of number of port groups can be used to select one number of port groups or more than one numbers of port groups from a set of numbers of port groups according to the configuration, or according to the determined one or more numbers of port groups for the codebook indication.

In some embodiments, determining a precoder for a transmission according to the configuration (e.g., at operation 504) includes: determining one or more numbers of port groups for a codebook indication, and determining a presence or a size of an indication of number of port groups (e.g., a port group indication) according to the determined one or more numbers of port groups for codebook indication. Thus, these embodiments provide for determining a domain of candidate codebooks indicated by a DCI. The presence or size of the port group indication can be determined according to the determined one or more numbers of port groups for codebook indication.

The determined one or more numbers of port groups may be the received one or more numbers of port group (e.g., in the configuration), in some examples. In other examples, the determined one or more numbers of port groups are different (e.g., inferred or determined via the configuration). For example, the wireless communication device may receive only one number of port groups, but one or more related number of port groups are determined, e.g., all the lower capabilities, all one or more numbers of port groups according to a predetermined rule.

For example, if only full coherent or only one port group is determined, a DCI does not include a port group indication, but includes a rank (1-8) and a TPMI. The precoder may be determined according to the rank and the TPMI in the DCI.

For example, if full coherent and first type of partial coherence or one port group and two port groups are determined, a DCI includes a 1-bit "number of port groups indication" to indicate one port group, or two port group. Then, for each port group, a rank and a TPMI or a set of parameters to determine a codebook should be present. That means for each port group, there is one set of rank+TPMI.

The TPMI can be an index to indicate a codebook from a predefined set of codebooks, or a set of parameters to determine a codebook/precoder.

In some embodiments, determining a precoder for a transmission according to the configuration includes: determining a given number of port groups according to an indication of number of port groups, and determining at least one of a rank, a number of layers, or a TPMI for each port group of the given number of port groups.

In some embodiments, determining a precoder for a transmission according to the configuration includes: determining a given number of port groups according to an indication of number of port groups, determining a phase between each two port groups of the given number of port groups, and determining at least one of a rank, a number of layers, or a TPMI for at least some of the port groups of the given number of port groups. In some embodiments, the indication of number of port groups is included in a DCI, a MAC CE, or an RRC signaling.

For example, if there are two port groups that are coherent, one phase is determined, e.g., received from network, via DCI, or MAC CE. For example, if there are four port groups that are coherent, 3 phases are determined, e.g., received from network, via DCI, or MAC CE. In this case, a rank and/or TPMI can be indicated for more than one port groups of the given number of port groups, i.e., all or part of port groups of the given number of port groups. In other words, a rank and/or TPMI can be shared for more than one port group of the given number of port groups. For example, in these embodiments, the at least one of the rank or the TPMI for at least some of the port groups is determined when all or port of the part groups are coherent.

In some embodiments, the precoder is determined from parameters of a downlink codebook-based scheme based on the one or more numbers of port groups being one port group, or the precoder is determined from parameters of an uplink codebook-based scheme based on the one or more numbers of port groups being more than one port group which are coherent.

In some embodiments, the wireless communication device further determines a value of an oversampling factor for a polarization direction according to a number of antenna elements on the polarization direction. In some examples, the polarization direction comprises a horizontal direction or a vertical direction.

In some embodiments, the configuration is received via one of a radio resource control (RRC) signaling, a medium access control (MAC) control element, or a downlink control indicator (DCI).

In some embodiments, the precoder is determined based on at least one of a number of port groups, a starting port index, or a port index order. In some embodiments, determination of the precoder based on at least one of the number of port groups, the starting port index, or the port index order includes determining the precoder from a set of codebooks which are determined based on at least one of the number of port groups, the starting port index, or the port index order. The set of codebooks comprises codebooks that each reflect a kind of port selection. If a port is selected, a vector for a layer with a non-zero element for the port and zero elements for other ports is determined.

In some examples, the precoder is determined according to a level of non-coherence indicated by the configuration. In some embodiments, the precoder is determined based on a consecutive number of port indexes according to the at least one of the number of port groups, the starting port index, or the port index order. In some embodiments, the starting port index is determined based on the number of port groups. In some embodiments, the port index order is one of: {0,4,1,5,2,6,3,7}, {0,1,2,3,4,5,6,7}, {0,2,1,3,4,6,5,7}, {0,1,4,5,2,3,6,7}, or {0,4,2,6,1,5,3,7}.

In some embodiments, the wireless communication device further maps ports of one or more port groups to ports of the precoder according to at least one of one or more pre-defined mappings. In some embodiments, the one or more pre-defined mappings include: a mapping of two port groups each having four ports to ports {0,1,4,5,2,3,6,7} of the precoder or to ports {0,2,4,6,1,3,5,7} of the precoder, or a mapping of four port groups each having two ports to ports {0,4,1,5,2,6,3,7} of the precoder.

Figure 6:
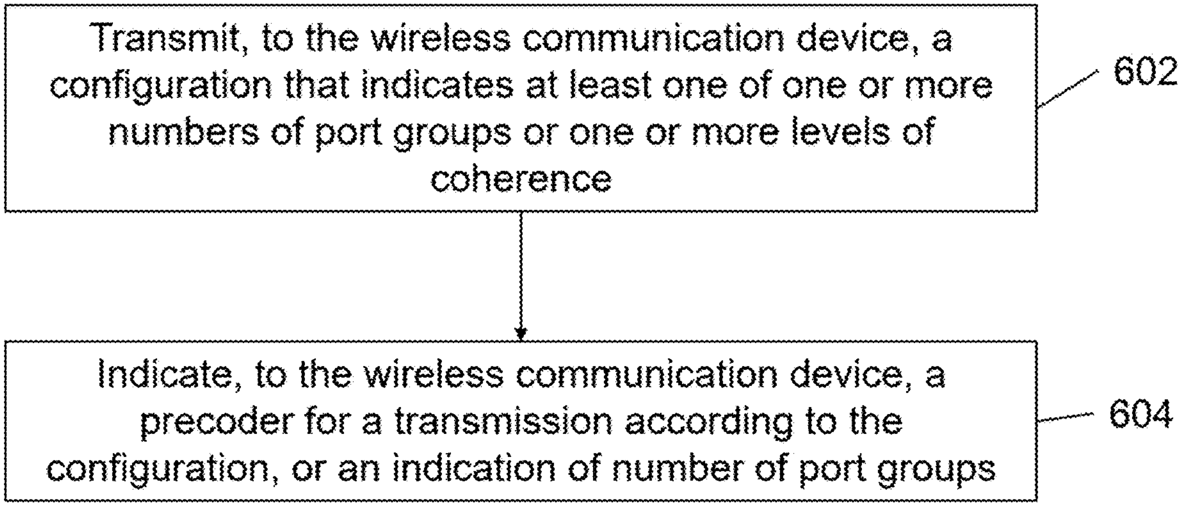
FIG. 6 shows an exemplary flowchart related to 8Tx transmission precoding including user equipment (UE) capability reporting.

FIG. 6 shows an exemplary flowchart related to capability reporting for 8Tx transmission precoding.

At operation 602, a wireless communication node (e.g., a base station) transmits, to the wireless communication device, a configuration that indicates at least one of one or more numbers of port groups or one or more levels of coherence.

At operation 604, the wireless communication node indicates, to the wireless communication device, a precoder for a transmission according to the configuration, or an indication of number of port groups. The transmission is then performed with the precoder. In some embodiments, the wireless communication node receives the transmission and decodes the transmission according to the precoder.

In some embodiments, the wireless communication node further determines a presence or a size of an indication of number of port groups for codebook indication. In some embodiments, the indication of number of port groups can be used to select a given number of port groups (or more than one numbers of port groups based on the given number of port groups) from a set of numbers of port groups according to the configuration, or according to the determined one or more numbers of port groups for the codebook indication.

In some embodiments, a total number of ports is eight. In some embodiments, the particular number of port groups is one of: one port group, two port groups, four port groups, or eight port groups; and the particular level of coherence is one of: full coherence, a first type of partial coherence, a second type of partial coherence, and non-coherence.

In some embodiments, the wireless communication node further indicates a number of antenna elements for a polarization direction in the configuration.

In some embodiments, an indicated number of port groups or an indicated level of coherence is a highest capability that indicates that one or more capabilities lower than the highest capability are configured or supported. In some embodiments, an order of port group capabilities from highest or lowest is one port group, two port groups, four port groups, and eight port groups. An order of coherence capabilities from highest to lowest is full coherence, a first type of partial coherence, a second type of partial coherence, and non-coherence.

In some embodiments, the indication of number of port groups is included in a DCI, a MAC CE, or an RRC signaling. In some embodiments, the wireless communication node further indicates a number of antenna elements for a polarization direction in the configuration.

In some embodiments, the wireless communication node transmits the configuration via one of a RRC, a MAC CE, or a DCI.

Figure 7:
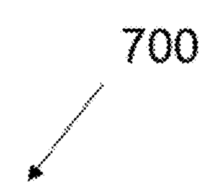
FIG. 7 shows an exemplary block diagram of a hardware platform that may be a part of a network device or a communication device.
Figure 7:
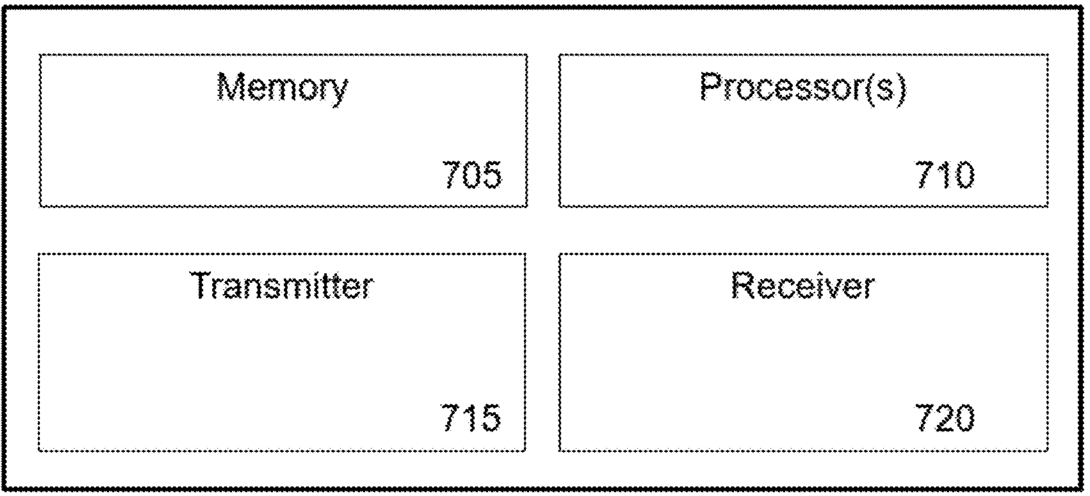

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 700 to perform the operations described in FIGS. 1 to 4 and in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

Figure 8:
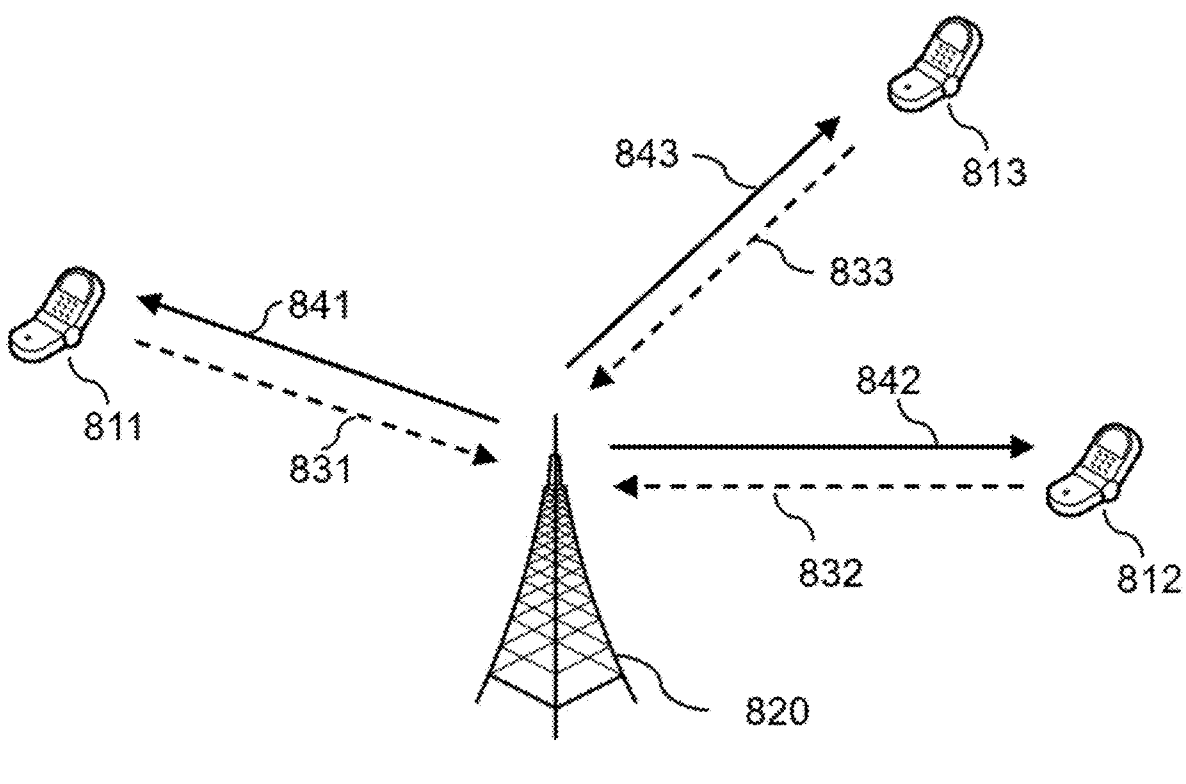
FIG. 8 shows an example of wireless communication including a base station (BS) and UE based on some implementations of the disclosed technology.

The implementations as discussed above will apply to a wireless communication. FIG. 8 shows an example of a wireless communication system (e.g., a 5G or NR cellular network) that includes a base station 820 and one or more user equipment (UE) 811, 812 and 813. In some embodiments, the UEs access the BS (e.g., the network) using a communication link to the network (sometimes called uplink direction, as depicted by dashed arrows 831, 832, 833), which then enables subsequent communication (e.g., shown in the direction from the network to the UEs, sometimes called downlink direction, shown by arrows 841, 842, 843) from the BS to the UEs. In some embodiments, the BS send information to the UEs (sometimes called downlink direction, as depicted by arrows 841, 842, 843), which then enables subsequent communication (e.g., shown in the direction from the UEs to the BS, sometimes called uplink direction, shown by dashed arrows 831, 832, 833) from the UEs to the BS. The UE may be, for example, a smartphone, a tablet, a mobile computer, a machine to machine (M2M) device, an Internet of Things (IOT) device, and so on.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

receiving, at a wireless device from a wireless communication node, a configuration that indicates at least one of one or more numbers of port groups for uplink transmissions from the wireless device, wherein a total number of ports is eight;

determining, at the wireless device, a precoder for an uplink transmission according to the configuration, wherein the precoder is determined from a set of candidate precoders that is reduced by one or more rules that specify a starting port index and a predefined port index order for each candidate precoder in the set; and performing, at the wireless device, the uplink transmission using the precoder.

2. The method of claim 1, wherein the one or more numbers of port groups indicated by the configuration is one or more of: one port group, two port groups, four port groups, or eight port groups.

3. The method of claim 1, further comprising:

transmitting, to the wireless communication node, information that indicates one or more supported numbers of port groups.

4. The method of claim 1, wherein an indicated number of port groups is a highest capability that indicates that one or more capabilities lower than the highest capability are configured or supported, and wherein an order of port group capabilities from highest to lowest is one port group, two port groups, four port groups, and eight port groups.

5. The method of claim 1, wherein determining a precoder for a transmission according to the configuration includes:

determining at least one of a rank, a number of layers, or a transmit precoding matrix indicator (TPMI) for each port group of the at least one number of port groups indicated by the configuration.

6. The method of claim 5, wherein an indication of number of port groups is included in a downlink control information (DCI), a medium access control control element (MAC CE) or a radio resource control (RRC) signaling.

7. The method of claim 1, wherein the configuration is received via one of a radio resource control (RRC) signaling, a medium access control (MAC) control element, or a downlink control indicator (DCI).

8. The method of claim 1, further comprising:

mapping ports of one or more port groups to ports of the precoder according to at least one of one or more pre-defined mappings.

9. The method of claim 8, wherein the one or more pre-defined mappings include:

a mapping of two port groups each having four ports to ports {0,1,4,5,2,3,6,7} of the precoder, or a mapping of four port groups each having two ports to ports {0,4,1,5,2,6,3,7} of the precoder.

10. A method for wireless communication, comprising:

transmitting, to a wireless communication device, a configuration that indicates at least one of one or more numbers of port groups for uplink transmissions from the wireless communications device, wherein a total number of ports is eight; and indicating, to the wireless communication device, a precoder for a transmission according to the configuration, or an indication of number of port groups, wherein the precoder is determined from a set of candidate precoders that is reduced by one or more rules that specify a starting port index and a predefined port index order for each candidate precoder in the set.

11. The method of claim 10, wherein the one or more port groups comprise one or more of: one port group, two port groups, four port groups, or eight port groups.

12. The method of claim 10, wherein an indicated number of port groups is a highest capability that indicates that one or more capabilities lower than the highest capability are supported or configured.

13. The method of claim 12, wherein an order of port group capabilities from highest to lowest is one port group, two port groups, four port groups, and eight port groups.

14. The method of claim 10, wherein the indication of number of port groups is included in a downlink control information (DCI), a medium access control control element (MAC CE) or a radio resource control (RRC) signaling.

15. The method of claim 10, further comprising:

indicating a number of antenna elements for a polarization direction in the configuration.

16. The method of claim 10, wherein the configuration is transmitted via one of a downlink control information (DCI), a medium access control control element (MAC CE) or a radio resource control (RRC) signaling.

17. An apparatus for wireless communication, comprising a memory and at least one processor, wherein the at least one processor executes instructions stored on the memory to implement a method comprising:

receiving, from a wireless communication node, a configuration that indicates at least one of one or more numbers of port groups for uplink transmissions, wherein a total number of ports is eight;

determining a precoder for an uplink transmission according to the configuration, wherein the precoder is determined from a set of candidate precoders that is reduced by one or more rules that specify a starting port index and a predefined port index order for each candidate precoder in the set; and performing the uplink transmission using the precoder.

18. An apparatus for wireless communication, comprising a memory and at least one processor, wherein the at least one processor executes instructions stored on the memory to implement a method comprising:

transmitting, to a wireless communication device, a configuration that indicates at least one of one or more numbers of port groups for uplink transmissions from the wireless communications device, wherein a total number of ports is eight; and indicating, to the wireless communication device, a precoder for a transmission according to the configuration, or an indication of number of port groups, wherein the precoder is determined from a set of candidate precoders that is reduced by one or more rules that specify a starting port index and a predefined port index order for each candidate precoder in the set.

* * * * *